United States Patent
Schaefer (10) Patent No.: US 6,177,198 B1
(45) Date of Patent: Jan. 23, 2001

(54) LEATHER WITH A FINISH ON THE BUFFED SURFACE, AND PROCESS FOR PRODUCING A LEATHER OF THIS TYPE

(76) Inventor: Philipp Schaefer, Am Leinewehr 25, 30519 Hannover (DE)

( * ) Notice: Under 35 U.S.C. 154(b), the term of this patent shall be extended for 0 days.

(21) Appl. No.: 09/348,967

(22) Filed: Jul. 7, 1999

(30) Foreign Application Priority Data

Jul. 7, 1998 (DE) .......................................... 298 12 075 U
Mar. 1, 1999 (DE) .......................................... 299 03 664 U (51) Int. Cl.[7] ................................................. B32B 27/40
(52) U.S. Cl. ................................... 428/423.4; 428/423.1; 428/423.3; 428/212; 428/213; 428/216; 428/217
(58) Field of Search ........................... 428/423.1, 423.3, 428/423.4, 212, 213, 214, 215, 216, 217

(56) References Cited

U.S. PATENT DOCUMENTS

| 4,190,694 | * | 2/1980 | Mück et al. | 428/212 |
| 4,515,852 | * | 5/1985 | Katabe et al. | 428/246 |
| 4,581,261 | * | 4/1986 | Schaefer et al. | 428/15 |
| 5,156,900 | * | 10/1992 | Nishimura | 42/151 |
| 5,916,669 | * | 6/1999 | Parker et al. | 428/216 |
| 5,939,188 | * | 8/1999 | Moncur et al. | 428/332 |

* cited by examiner

Primary Examiner—D. S. Nakarani
Assistant Examiner—Christopher Paulraj
(74) Attorney, Agent, or Firm—Herbert L. Lerner; Laurence A. Greenberg; Werner H. Stemer (57) ABSTRACT

The leather has a finish on a buffed surface. The finish layer is formed in a plurality of layers including an outer layer with a given hardness and a particular surface effect preformed in a hot substrate having a structure corresponding to the particular surface effect the outer layer being formed of a solidified, cross-linked, hydrolysis-resistant, lightfast, polyurethane-containing dispersion, and having a thickness of between 0.01 and 0.08 mm, and an inner layer bonded to the buffed surface leather and comprising a solidified, highly crosslinked, hydrolysis-resistant, lightfast, polyurethane-containing dispersion and having a hardness less than a hardness of the outer layer.

32 Claims, 6 Drawing Sheets

LEATHER WITH A FINISH ON THE BUFFED SURFACE, AND PROCESS FOR PRODUCING A LEATHER OF THIS TYPE

BACKGROUND OF THE INVENTION

Field of the Invention

The invention relates to a leather, on the buffed surface of which a finish has been provided, where the finish has an outer layer with a particular surface effect, which has been prefabricated on a hot substrate having a structure corresponding to this surface effect, and comprises a solidified, polyurethane-containing dispersion, and also has an inner layer which has been bonded to the buffed surface of the leather and likewise comprises a solidified, polyurethane-containing dispersion. For the purposes of the invention, th4e term "leather" means either natural leather, the buffed grain side of which has been provided with a finish, or else split leather whose buffed surface has been provided with a finish.

German Patent 32 29 150 discloses a finished split leather in which the finish is composed of two layers. Here, an aqueous polyurethane dispersion is applied to a substrate heated to a temperature of from 70 to 185° C. and solidifies on the substrate to give a film. The film is thereupon bonded, using pressure and suction, to the split-leather surface by a polyurethane dispersion comprising hollow microspheres. This method cannot produce thin finishes.

European Patent 105 046 describes a finished split leather in which the finish is likewise composed of two layers. An inner layer adjacent to the split leather has a thickness of from 0.12 to 0.45 mm, i.e. a substantial thickness. The properties of the leather are thereby adversely affected.

German published patent application 195 10 242 has disclosed a full-grain natural leather whose grain side has been provided with a finish which is applied to shaped pieces cut out from the natural leather. The finish there is composed of two layers formed by solidifying an aqueous, polyurethane-containing polymer dispersion. That finish has a thickness of up to 0.13 mm.

German published patent application 195 10 240 discloses the application of a finish with a varied surface effect and a thickness of up to 0.15 mm to a leather support having a specified margin.

German Utility Model 298 12 075.5 describes a full-grain natural leather provided with a finish and having a specified margin for producing automotive parts and composed of three layers each comprising a polyurethane dispersion. The outermost layer here has a particular surface effect and is prefabricated on a hot substrate having a corresponding structure, and its Shore hardness is greater than those of the intermediate and inner layers. This is claimed to ensure that the leather has the properties required for producing automotive parts.

German published patent application 37 20 776 discloses a leather material provided with a finish which is composed of a relatively thick leveling layer bonded to the leather and, applied thereto, a top layer which forms the visible surface and may be composed of two sublayers arranged one on top of the other, where there may be provision of a primer between the individual layers to improve adhesion, if desired. The leveling layer here is applied to the leather surface as a leveling substrate in the form of granules of leveling material. A finish of this type has substantial thickness, resulting in loss of leather properties.

In prior art leathers provided with a finish, the outer layer with a visible surface is bonded to the split leather by applying the material forming the inner layer in the wet state either to the leather surface or to the solidified outer layer, then laminating while supplying heat, whereupon some of the wet material penetrates into the leather and levels any uneven areas in the leather surface. It is therefore necessary to apply an appropriately large amount of the material forming the inner layer in order to ensure leveling of the uneven areas in the leather surface and reliable bonding, and this entails the thicknesses mentioned. The result is that known finished leathers have only low water-vapor permeability and water-vapor coefficients and therefore do not fulfill the requirements frequently placed upon leather.

SUMMARY OF THE INVENTION

It is accordingly an object of the invention to provide a leather with a finish on its buffed surface, which overcomes the above-mentioned disadvantages of the heretofore-known devices and methods of this general type and which further improves the properties of a leather of that type, and in particular renders a leather of that type more usable for producing internal trim for conveyances, such as automobiles, aircraft and boats, for example for producing interior trim, trims for door sides, steering-wheel covers and the like, and also for producing shoes, in particular workwear shoes, and also for producing luggage, where the finish can retain the desired low thickness. Another object of the invention is substantially to increase water-vapor permeability and water-vapor coefficient. Another object of the invention is to increase abrasion resistance, lightfastness, heat resistance, chemicals resistance and solvent resistance, and also stability of grain. A further object of the invention is to be able to give a stable shape to the parts produced from the leather provided with a finish so that these parts retain the prescribed form after they have been shaped but surface protection is provided by the finish. A final object of the invention is to produce a leather whose visible side has various surface effects or has been provided with representations which do not have to be applied separately and subsequently, for example by laser treatment.

With the foregoing and other objects in view there is provided, in accordance with the invention, a leather assembly, comprising:

a leather having a buffed surface;

a finish layer on said buffed surface, said finish layer comprising a plurality of layers including an outer layer with a given hardness and a particular surface effect preformed in a hot substrate having a structure corresponding to the particular surface effect said outer layer being formed of a solidified, crosslinked, hydrolysis-resistant, lightfast, polyurethane-containing dispersion, and having a thickness of between 0.01 and 0.08 mm, and an inner layer bonded to said buffed surface leather and comprising a solidified, highly crosslinked, hydrolysis-resistant, lightfast, polyurethane-containing dispersion and having a hardness less than a hardness of said outer layer.

Especially if the inner layer is composed of two sublayers comprising a solidified, crosslinked polyurethane dispersion and fused to one another by applying pressure and heat, and is thinner than the outer layer, where the two sublayers forming the inner layer are fused after they have been solidified but before the crosslinking agent becomes effective, the thickness of this inner layer may be less than 0.03 mm since there is no need for the two sublayers forming the inner layer to be exposed before they have solidified, as is the case in known processes, to bonding pressure which requires an appropriate amount of the dispersion material forming the inner layer in order to ensure reliable bonding between the outer layer and the leather surface. This procedure gives undesirable filling of the pores in the outer layer and the cavities in the leather. The invention, in contrast, allows the inner layer to be constructed sufficiently permeably to give the novel leather extremely high water-vapor permeability of more than 3 mg/cm$^2$×h and a water-vapor coefficient of more than 25 mg/cm$^2$ to European Standard EN 344-1, and the leather thus fulfills the requirements placed upon finished parts made from a leather of this type.

The invention allows the inner layer to be constructed in such a way that it does not form a coherent film, and this improves water-vapor permeability.

The outer layer preferably has highly developed elastomeric properties and does not have thermoplastic properties, and recovers completely after elongation at a temperature of from 100 to 120° C., whereas the inner layer, unlike the outer layer, does not have highly developed elastomeric properties and has greater residual elongation than the outer layer at a temperature of from 100 to 120° C. This ensures that after a cut piece of leather has been shaped, for example to give interior trim for an automobile door, or a dashboard trim for an automobile, or a shoe upper, it retains the form which it was given when it was shaped. This gives a substantial reduction from the recovery force arising in layers composed of an elastomeric material. Because the inner layer has a lower level of elastomeric properties than the outer layer, depending on the degree of crosslinking, the molecules become directional and oriented during elongation and there is therefore virtually no tendency to revert to the original situation. A leather finished according to the invention, therefore, substantially retains the surface effect of the outer layer, even if this has areas of great unevenness or elevations and depressions, at the elongation of 30% which arises during the production of steering-wheel covers, trim for center consoles of automobiles, shoe uppers and the like, contrasting with known finished leathers, where even low elongation causes flattening of the surface. In fact, during the thermal fusion of the two sublayers forming the inner layer, the material forming the inner layer is elongated and thus stretched as a result of exposure to pressure and heat, and this creates at least some of the abovementioned directionalization and orientation of the molecules. The result is that although the inner layer has low thickness, it has particularly high mechanical strength.

It is useful for the outer layer to be porous, further reducing the recovery force in the finish and further improving water-vapor permeability and water-vapor coefficient. The porous structure, which in particular also has open-celled through-pores, arises here during the prefabrication of this outer layer on the hot substrate having the abovementioned structure. At least some part of the walls of these through-pores of the outer layer preferably has a lining of the material of the inner layer adjacent to this outer layer. This material does not therefore fill these pores completely, and the outer-layer porosity required for a high water-vapor permeability and water-vapor coefficient is therefore retained.

The outer layer usefully comprises a relatively large proportion of pigments, whereas the inner layer has a relatively low proportion of pigments, preferably no pigments. This ensures that the fusion of the two sublayers forming the inner layer is not impaired by pigments.

According to another feature of the invention an amount of hollow microspheres, preferably from 3 to 6% by volume, may be embedded into the outer layer and/or into the inner layer. Hollow microspheres of this type are composed, for example, of a thin shell of polyvinylidene chloride copolymer and a gas inside, preferably air. Embedding these hollow microspheres can also reduce the recovery force of the individual layers without impairing their mechanical properties.

The outer layer preferably consists essentially of a solidified polyester-polyurethane dispersion and even without addition of a crosslinking agent when dry has a softening point of from 180 to 240° C., or this outer layer consists essentially of a solidified polyether-polyurethane dispersion and even without addition of a crosslinking agent when dry has a softening point of from 180 to 240° C.

The chemical nature of the inner layer is preferably different from that of the outer layer and the inner layer is composed either predominantly of a solidified polyester-polyurethane dispersion and when dry without addition of a crosslinking agent has a softening point of from 45 to 95° C., or this layer is composed predominantly of a solidified polyether-polyurethane dispersion and when dry without addition of a crosslinking agent has a softening point of from 45 to 95° C. This softening point permits thermal fusion to take place at relatively low temperatures.

The surface of the outer layer may be uniform and have, for example, the structure of a nappa leather or of a nubuck. However, in the context of the invention it is also possible to provide this outer layer with various different surfaces resulting from different surface effects on the substrate on which the outer layer is prefabricated, so that, for example, in a cut section for a shoe upper the surface in the cap area has the appearance of a nubuck and in the remaining area the appearance of a grained leather, or in cut sections for automobile seats the central area has a smooth leather surface and the lateral areas have a rough, for example, nubuck-like, surface, to prevent sideways slipping of the person sitting thereon. It is therefore unnecessary to produce a cut section of this type for a shoe upper or an automobile seat of this type in two or more sections having different surface effects and joined by a seam. In addition, the outer layer may have representations, such as logos or other symbols, for example trademarks of producers or imitation embroidery, formed during production of the outer layer, whereas these had previously been produced by complicated laser treatment of the leather surface of each individual piece. Using this method it is also possible to construct these representations or symbols so that they are raised and project from the adjacent surface of the outer layer, giving the impression that these representations or symbols have been produced at a later stage, for example by embroidery. The thickness of the outer layer in the area of the raised representations and symbols is nevertheless essentially the same as the thickness of the outer layer in the area of the adjacent surface, and therefore these raised representations and symbols do not impair the properties of the leather provided with a finish.

If a number of shaped sections are to be cut out or stamped out from the leather, it is advantageous for the outer layer to be provided with markings which indicate the outline of the individual shaped sections.

It is also useful for at least part of the finish comprising the two layers to have been provided with perforations, additionally increasing water-vapor permeability.

The leather is preferably chromium-free and/or low-fogging.

With the above and other objects in view there is also provided, in accordance with the invention, a leather production method, which comprises the following steps:

providing a leather with a buffed surface;

providing a substrate with an upper side composed of silicone rubber and an underside composed of metal;

heating the upper side to a temperature of about 100° C. and applying an amount of a polyurethane-containing dispersion with elastomeric properties to an upper surface of the upper side of the silicone rubber, and supplying heat to allow the dispersion to dry on the substrate, thereby forming an outer layer with a thickness of between 0.01 and 0.08 mm;

subsequently applying a polyurethane-containing dispersion comprising a crosslinking agent and not having highly developed elastomeric properties to the solidified outer layer and likewise a polyurethane-containing dispersion comprising a crosslinking agent and not having highly developed elastomeric properties is applied to the buffed surface of the leather;

removing at least a large portion of a liquid present in the dispersions to form two sublayers which, one upon another, form an inner layer, where an amount of the polyurethane-containing dispersion not having highly developed elastomeric properties is selected such that the inner layer has a thickness of between 0.008 and 0.03 mm, and thermally fusing the two sublayers forming the inner layer to one another, by applying pressure and heat, before the crosslinking agent becomes effective.

There is further provided, in accordance with the invention, a method of producing a leather assembly with a finish formed on a buffed surface of the leather. The method comprises:

providing a substrate having an upper side composed of silicone rubber and an underside composed of metal;

heating the substrate and, with a top surface of the upper side having a temperature of about 100° C., applying an amount of a polyurethane-containing dispersion with elastomeric properties to the top surface, and supplying heat to allow the dispersion to dry on the substrate, so as to form an outer layer of thickness from 0.01 to 0.08 mm;

subsequently applying an amount of a polyurethane-containing dispersion comprising a crosslinking agent and not having highly developed elastomeric properties to a buffed surface of the leather and removing liquid from the dispersion until the amount remaining is from 5 to 25 g/m$^2$, so that the thickness of the inner layer formed is from 0.008 to 0.03 mm; and fusing the two layers to one another by applying pressure and heat.

Other features which are considered as characteristic for the invention are set forth in the appended claims.

Although the invention is illustrated and described herein as embodied in a leather on the buffed surface of which a finish has been provided, and process for producing a leather of this type, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
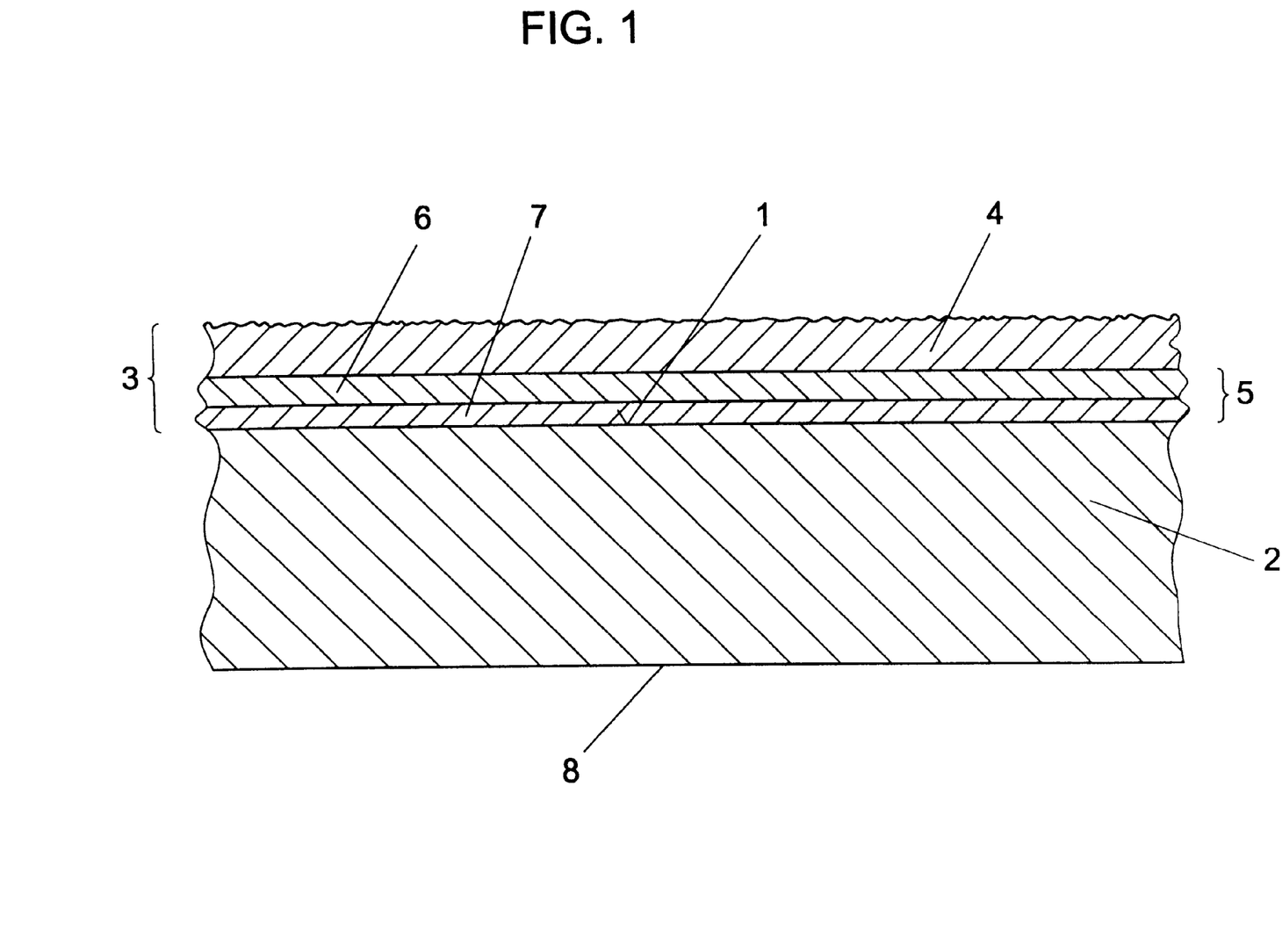
FIG. 1 is a cross section taken through an embodiment of a grained leather provided with a finish according to the invention.

Referring now to the figures of the drawing in detail and first, particularly, to FIG. 1 thereof, there is seen a piece of leather 2 provided with a finish. The leather 2 is composed either of a buffed split leather, in which case a split double cowhide croupon generally measures up to 2.2 m$^2$ and has a thickness of from 1.0 to 2.4 mm. The leather 2 is preferably composed of a grained leather whose grain has been slightly buffed by working with a buffing paper of from 100 to 1000 grade, preferably from 180 to 400 grade, to give a slightly to moderately fibrous surface 1.

A finish 3 is applied to the fibrous surface 1 of the leather 2. The finish 3 is composed of an outer layer 4 and of an inner layer 5 which comprises two sublayers 6 and 7. Before the finish is applied, the leather 2 may, for example, be cut to a format required for producing, say, a shoe upper or an automobile seat. However, it is also possible for the entirety of the leather 2 to be finished and for a number of relatively small shaped sections then to be cut or stamped out.

The overall thickness of the finish 3 is less than 0.08 mm, preferably less than 0.06 mm.

Figure 2:
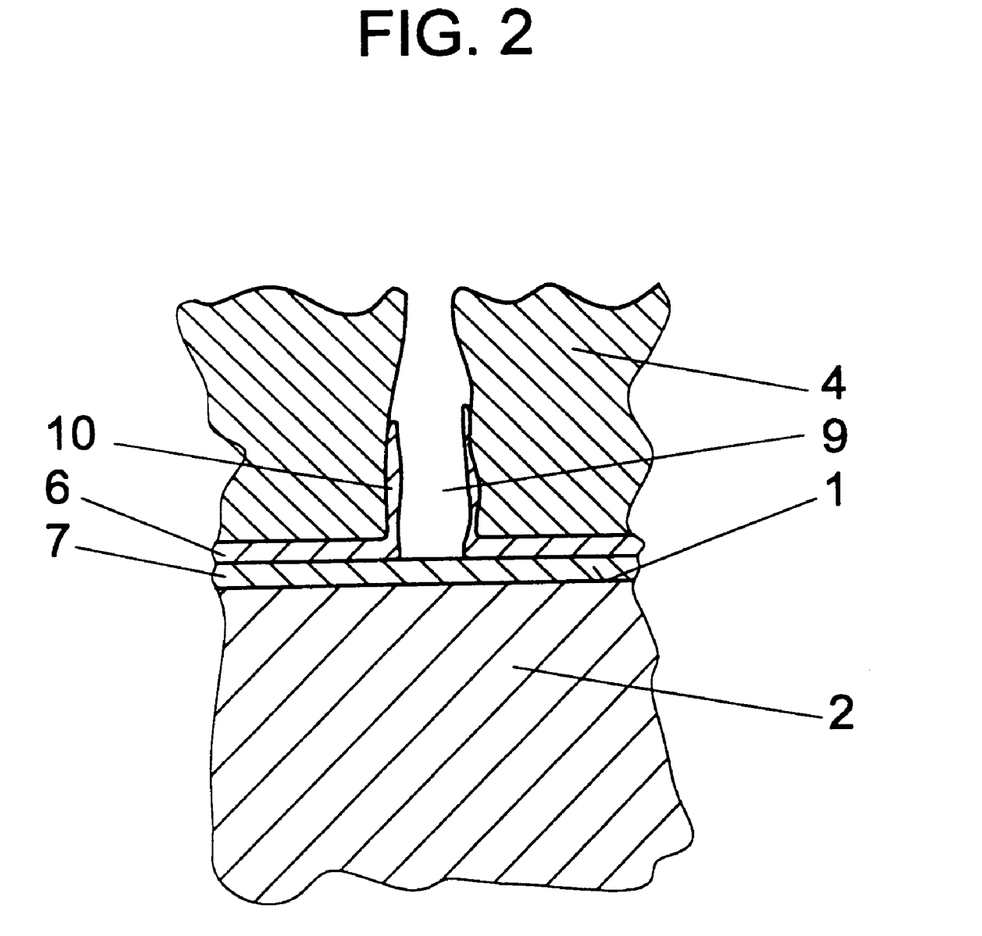
FIG. 2 is a greatly enlarged cross section in the area of a pore in the outer layer.

The outer layer 4 is prefabricated on a substrate whose upper side is composed of silicone rubber and whose underside is composed of metal, and which is heated from the metal underside in such a way as to give the surface of the upper side a temperature of about 100° C. An amount of a polyurethane dispersion with elastomeric properties is applied to the structured silicone-rubber upper side, so that the thickness of the outer layer 4 after solidification is from 0.01 to 0.08 mm. Hollow microspheres may have been embedded into the polyurethane dispersion. A polyurethane dispersion without crosslinking agent may also be used, but a crosslinking agent increases the melting point of the outer layer 4 and therefore its heat resistance. Because the outer layer 4 is prefabricated on the substrate before any bonding to the inner layer 5, no flattening occurs when it is solidified. This outer layer 4 may be produced by repeated spraying of an aqueous polyurethane dispersion onto the hot substrate, which after solidification gives a homogeneous coherent monolayer. According to the invention, the sublayers formed by the individual spray applications may comprise different proportions of pigment. The sublayer formed by the first spray application of a polyurethane-containing dispersion onto the hot substrate preferably has a lower proportion of pigment than the remaining sublayers, thereby significantly improving the color-abrasion resistance of the finish. As can be seen from FIG. 2, the outer layer 4 has a large number of through-pores 9, and at a preferred thickness of 0.04 mm these pores 9 are clearly discernible when this layer 4 is illuminated from the back.

The inner layer 5 is composed of the two sublayers 6 and 7 which have a chemical constitution that is different from that of the outer layer 4, and its thickness is from 0.008 mm to 0.03 mm, making it significantly thinner than the outer layer 4. The procedure for forming this inner layer is that the crosslinkable polyurethane dispersion forming the sublayer 6 is applied to the solidified outer layer 4 located on the substrate and the crosslinkable polyurethane dispersion forming the sublayer 7 is applied to the fibrous surface 1 of the leather 2. The crosslinkable polyester- or polyether-polyurethane dispersion used for the two sublayers 6 and 7 usefully has different chemical behavior from that of the polyurethane dispersion forming the outer layer 4 and, in contrast to this polyurethane dispersion forming the outer layer 4 comprises no pigments or only a small amount of pigments, which impair thermal fusion. In addition, this polyurethane dispersion forming the sublayers 6 and 7 preferably comprises less solids than the polyurethane dispersion forming the outer layer 4, so that the film present after solidification is not coherent and does not seal the pores of the outer layer 4.

The sublayer 7 is slightly thicker than the sublayer 6, which does not form a coherent film. As can be seen from FIG. 2, the pores 9 present in the outer layer 4 are not sealed but merely provided with a lining 10, and this is significant for the high water-vapor permeability of the finished leather. The result is that the water is removed from the crosslinkable polyurethane dispersions, and specifically the water from the polyurethane dispersion forming the sublayer 6 evaporates as a result of heat supplied via the substrate, and most of the water from the polyurethane dispersion forming the sublayer 7 passes into the leather. After removal of the water the two sublayers 6 and 7 have a maximum content of solids, such as polyurethane, pigments and fillers, of 80 g per m$^2$, preferably from 10 to 40 g per m$^2$. After drying in this way and before the crosslinking agent becomes effective, the sublayer 7 located on the fibrous surface 1 of the leather is laid upon the sublayer 6 located on the solidified outer layer 4, whereupon a pressure is exerted, via a pressure-equalizing resilient backing plate, on that side 8 of the leather which faces away from the finish 3, and at the same time the substrate is heated from its metal underside to a temperature of from 50 to 130° C., preferably 90° C., thermally fusing the two sublayers 6 and 7 to one another. If desired, further heating can be brought about using additional heat sources. Prior to crosslinking, the two sublayers 6 and 7 have a low melting point and the heat supplied therefore gives complete fusion. Since heating is predominantly via the substrate the vapor bubbles formed pass upward and are absorbed by the leather.

As a result of the pressure exerted via the pressure-equalizing resilient backing plate during the thermal fusion process, the profile of the fibrous surface 1 becomes matched to the thin finish 3, and since the inner layer 5 does not form a coherent film the porosity of this inner layer favors escape of residual moisture into the leather. The pressure exerted also brings about some stretching of the inner layer 5, and this stretching is not subsequently recovered.

The two sublayers 6 and 7 form a homogeneous and inseparable inner layer 5, but it can be discerned from a microsection that the inner layer 5 has been produced by fusion of two previously solidified sublayers.

However, it is also possible to produce the inner layer 5 in a single operation so that it is not composed of two sublayers. In this case a polyurethane dispersion comprising a crosslinking agent is simply applied to the buffed surface of the leather 2, whereupon the water is removed until the residual amount is from 5 to 25 g/m$^2$, to form an inner layer 5 with a thickness of from 0.008 to 0.03 mm. The leather is then placed with its surface 1, to which the polyurethane dispersion has been applied, on the prefabricated outer layer 4, and the two layers are thermally fused by applying pressure and heat. The residual water improves the heat-activatable adhesion properties so that here again a temperature of from 50 to 130° C., preferably 90° C., is sufficient.

The use of a crosslinking agent improves the aging resistance and the chemical resistance of the outer layer 4.

To prevent undesirable ingress of water the side 8 of the leather 2 which faces away from the finish 3 may be protected with a thin polymer coating.

Figure 3:
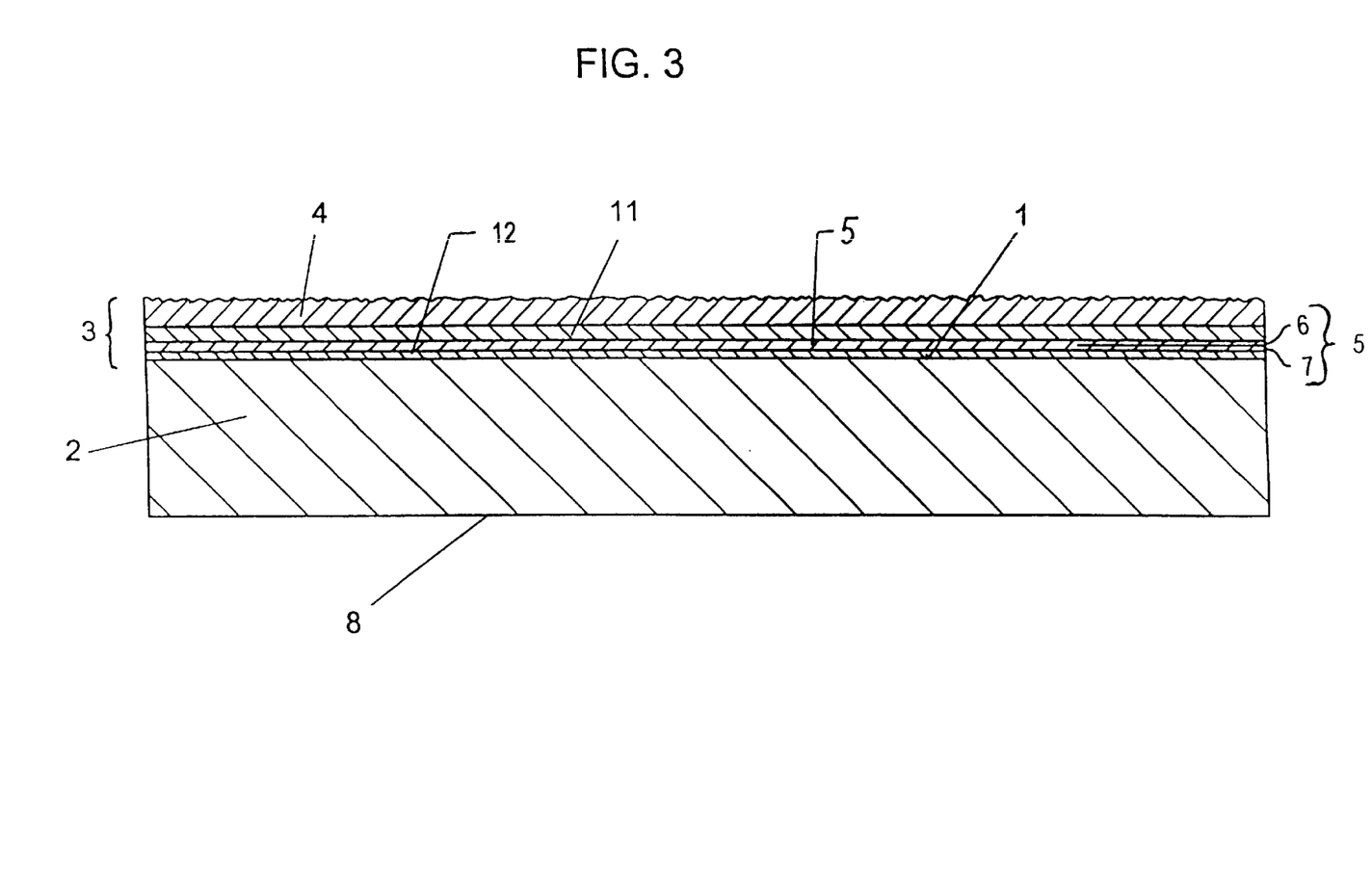
FIG. 3 is a section taken through another embodiment of a grained leather provided with a finish according to the invention.

FIG. 3 shows an embodiment in which the finish 3 is composed of an outer layer 4 and of an inner layer 5, and also of an intermediate layer 11, and also, if desired, of an extremely thin intermediate layer 12 which, however, may also be absent.

The outer layer 4 is again prefabricated on a hot substrate having a structure by applying to this substrate a crosslinkable, hydrolysis-resistant, lightfast polyurethane dispersion which comprises a pigment and preferably comprises 1% of silicone-based additive and allowing this dispersion to solidify by heating the substrate. The structure of the substrate is such as to give the visible surface of the outer layer 4 a varying appearance. The leather 2 having an outer layer 4 of this type may therefore, for example, have in part the appearance of a carbon fabric and in part the appearance of nubuck, or else an inscription may be visible, for example "airbag" or a company logo, with the appearance of embroidery, for example. The structure of the substrate may also be such that when a number of shaped sections are produced from the leather, appropriate markings are formed corresponding to the margins of the shaped sections subsequently to be cut or stamped out.

To produce the intermediate layer 11 a crosslinkable, hydrolysis-resistant, lightfast polyurethane dispersion comprising a smaller amount of pigment than that in the outer layer 4 is applied to the solidified outer layer 4 still located on the substrate. The Shore hardness of the intermediate layer 11 is lower than that of the outer layer 4, and since the intermediate layer is formed on the outer layer 4 it has an inseparable bond to the outer layer 4.

An inner layer 5 serves to bond the two layers 4 and 11 to the surface 1 of the leather 2, and is composed of a highly crosslinked, hydrolysis-resistant, lightfast polyurethane dispersion, and has a lower hardness than the outer layer 4 and the intermediate layer 11. To improve bonding there may, if desired, be provision of an intermediate layer 12, formed from a polyurethane solution, between the inner layer 5 and the surface 1 of the leather 2. The intermediate layer 12 is formed by spraying the low-concentration polyurethane solution comprising less than 8% of solids onto the grained surface 1, buffed using a buffing paper of from 100 to 1000 grade, of the leather 2, and after removal of the solvent has a thickness of about 0.001 mm, and in the finished product is therefore only visible under very high magnification. This intermediate layer gives very high wet adhesion between the grained surface 1 of the leather 2 and the finish 3.

The inner layer 5, and also the intermediate layer 12, preferably do not form a coherent film, and thus ensure that the water-vapor permeability is as required.

The thickness of the inner layer 5, and, respectively, if an intermediate layer 12 is present the total of the thicknesses of the inner layer 5 and of the intermediate layer 12, is less than 0.04 mm, preferably less than 0.02 mm, and is always less than the total of the thicknesses of the outer layer 4 and of the intermediate layer 11.

To increase water-vapor permeability, the finish 3 composed of the individual layers may have perforations not illustrated. It is moreover advantageous for that side 8 of the leather 2 which faces away from the finish 3 to have provision of a thin polymer coating which prevents ingress of water from the back.

Figure 4:
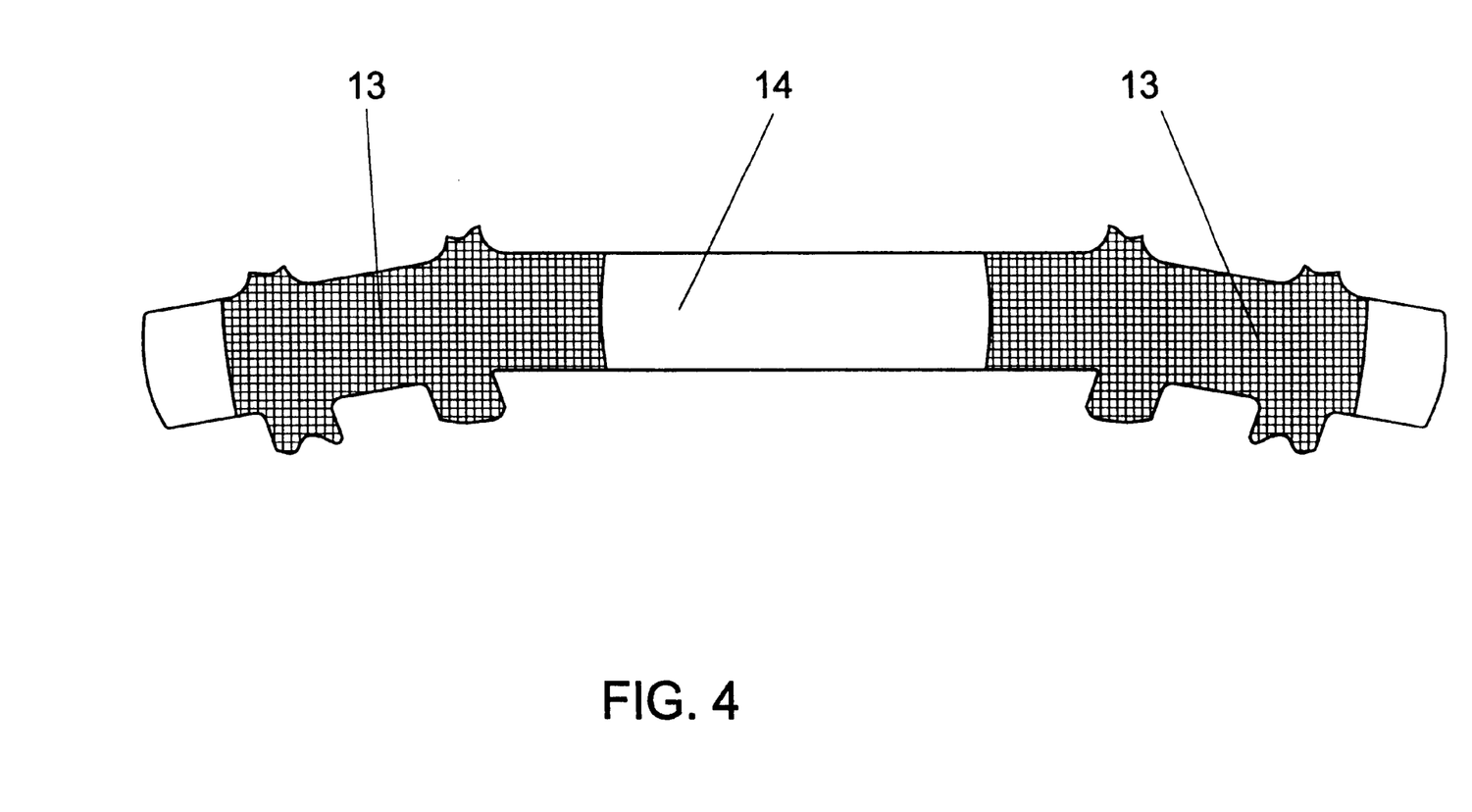
FIG. 4 is a cut section of a leather according to the invention for a steering-wheel cover.

FIG. 4 shows a cut section produced from a novel leather for a steering-wheel cover produced from a novel leather and having a carbon fabric appearance in the spar area 13 and a nubuck appearance of the outer layer 4 in the remaining area 14, this appearance being produced by appropriate structuring of the silicone upper side of the substrate. However, this structure of the upper side of the substrate may also be such that an inscription, such as "airbag" or an embroidered company logo, appears on the visible side of the outer layer 4. The areas 12 and 13 may moreover have different colors. The structure of the upper side of the substrate may also be such that when a number of shaped sections are produced from the leather appropriate markings are present corresponding to the margins of the shaped sections subsequently to be cut or stamped out.

Figure 5:
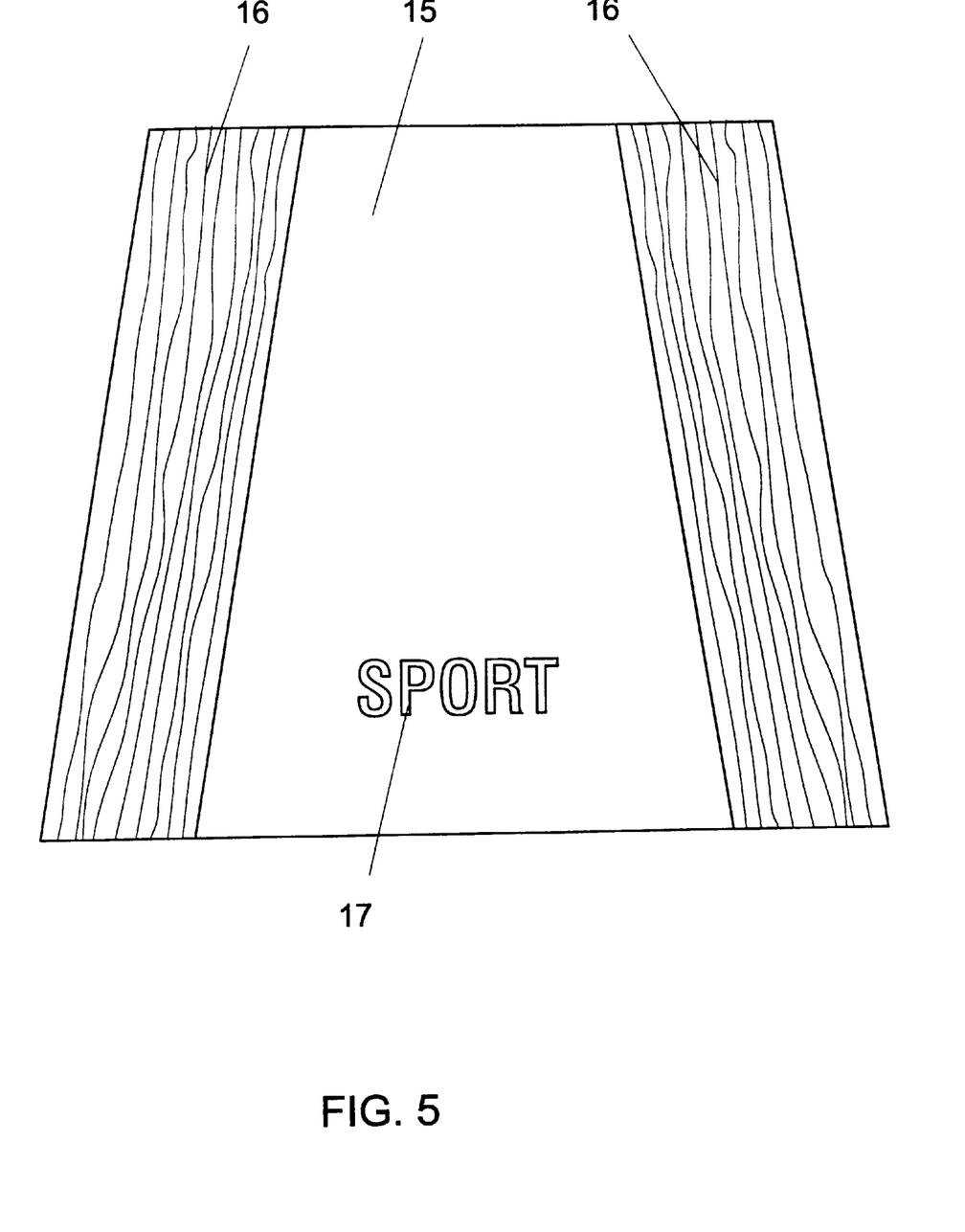
FIG. 5 is a plan view onto a cut section for an automobile seat.

FIG. 5 shows a cut section for an automobile seat. The central part 15 here has an outer layer 4 with a grained surface and is therefore essentially smooth, whereas the side margins 16 have, for example, a nubuck-like surface with increased coefficients of friction and therefore prevent sliding to the side of the person located on the seat. Here again, the central part 15 may be colored differently from the margins 16. This means that the surface of one and the same cut section may have different effects and therefore be matched to different requirements. An inscription 17 may also be formed during the production of the automobile seat.

If desired, a further thin finish layer may also be applied to the surface of the outer layer 4 and comprise, for example, antislip agents or chemicals modifying the degree of gloss. The thickness of a finish layer of this type is not taken into account in the thicknesses given for the individual layers, and the same applies if what is known as a buffing primer or an impregnating material is present on the leather 2, or also if there is a thin woven or knitted fabric arranged on the surface 1 of the leather 2.

The thickness of the finish 3 is measured between two measuring wheels or measuring disks of diameter 10 mm, as are usual for measuring the thickness of leather. Prior to measurement, the finish 3 composed of the layers 4 and 5 is peeled from the leather 2 using a sharp implement, e.g. a razor blade. The thickness of the layers 4 and 5 is determined while applying a pressure of 5 kg to level uneven areas of the structured surface of the finish. Prior to thickness measurement care must be taken that there are no leather fibers on the layer 5 which might affect the thickness.

Figure 6:
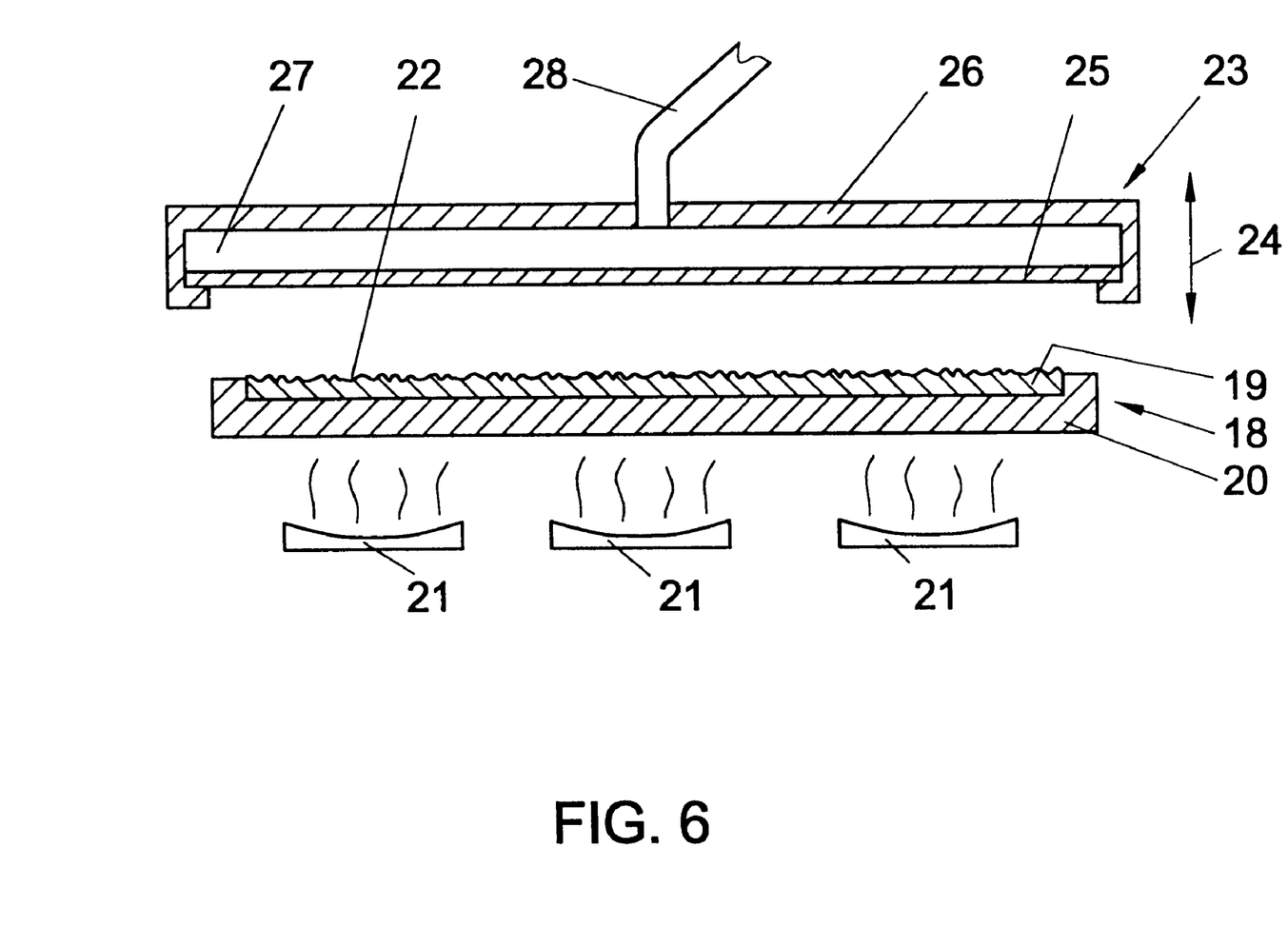
FIG. 6 is a diagrammatic view of an apparatus used for finishing a leather.

FIG. 6 shows the equipment required for producing the finish. There is provided a substrate 18 whose upper side 19 is composed of silicone rubber and whose underside 20 is composed of metal. Below the underside 20 there are heat sources 21 shown diagrammatically, which heat the underside 20 and, via this, the upper side 19. The surface 22 of the silicone-rubber upper side 19 has a structure which corresponds to the visible side of the finish 3 to be produced. To produce the finish, a polyurethane dispersion with elastomeric properties is firstly sprayed, airless, at high pressure onto this surface 22 which has a structure, and is allowed to solidify by supplying heat from the heat sources 21. The spraying may take place in a number of operations in succession, and the outer layer is then composed of two or more sublayers which may comprise different proportions of pigment but nevertheless form a chemically homogeneous unit. The sublayer formed by the first spray application of a polyurethane-containing dispersion onto the hot substrate preferably has a lower pigment content than do the other sublayers, and this significantly improves color-abrasion resistance. The temperature here of the surface 22 is about 100° C. In a preferred method of production, a polyurethane dispersion comprising a crosslinking agent is applied to the solidified outer layer, formed as described, of the finish, and a polyurethane dispersion comprising a crosslinking agent is likewise applied to the buffed surface of a leather, and the water is subsequently removed from these polyurethane dispersions. The water in the polyurethane dispersion applied to the outer layer evaporates here as a result of heat supplied from the heat sources 21, and most of the water from the polyurethane dispersion applied to the surface of the leather passes into the leather.

If cut sections of leather are produced with a visible side having different colors, i.e. a steering-wheel cover as in FIG. 4, for example, with a black appearance in the spar area 13 and a brown appearance in the remaining area 16, the procedure is as follows: the areas 14 on the hot substrate are firstly covered with a mask, and a black-pigmented polyurethane-containing dispersion is then sprayed onto the hot substrate. The mask is then removed and a brown-pigmented polyurethane-containing dispersion is then sprayed onto the hot substrate and also onto the black polyurethane dispersion which has to some extent already solidified. In the area 13, therefore, the outer layer 4 is formed from at least two spray applications while in the remaining area 14 it is formed from at least one spray application. The thickness of the outer layer 4 in the area 13 is not significantly greater than in the area 14, and is less than 0.08 mm. The advantages of this process for producing leather with different colors in one operation are that application of color at a later stage can be dispensed with and that the different color areas are particularly abrasion-resistant.

The leather together with the sublayer located thereupon and formed from polyurethane dispersion solidified to some extent is then laid upon the sublayer located on the outer layer and formed from the polyurethane dispersion solidified to some extent, whereupon the two sublayers are firmly fused by applying pressure and heat. For this, pressure is exerted via a pressure unit 23 which can be moved to and fro in the direction of the arrow 24. The pressure unit 23 has a resilient backing plate 25 secured in a housing 26. A pressure line 28 leads to the cavity 27 and, after the equipment 23 has been lowered, introduces a pressure medium which presses the resilient backing plate 25 onto the back of the leather with a pressure of from 0.5 to 5.5 kg/cm². This pressure is maintained for a period of from 3 to 20 sec, but at least until the inner layer 5 has reached a temperature of at least 45° C. At the same time heat is supplied from the heat sources 21, resulting in thermal fusion of the two sublayers forming the inner layer.

I claim:

1. A leather assembly, comprising:
a leather having a buffed surface;
a finish layer on said buffed surface, said finish layer comprising a plurality of layers including
an outer layer with a given hardness and a particular surface structure preformed in a hot substrate having a structure corresponding to the particular surface structure, said outer layer being formed of a solidified, cross-linked, hydrolysis-resistant, lightfast, polyurethane-containing dispersion, and having a thickness of between 0.01 and 0.08 mm, and an inner layer bonded to said buffed surface leather and comprising a solidified, crosslinked, hydrolysis-resistant, lightfast, polyurethane-containing dispersion and having a hardness less than a hardness of said outer layer, said inner layer being thinner than said outer layer and comprising two sublayers formed of a solidified, crosslinked polyurethane dispersion and fused to one another by application of pressure and heat.

2. The leather assembly according to claim 1, which further comprises an intermediate layer between said outer layer and said inner layer, said intermediate layer comprising a solidified, crosslinked, hydrolysis-resistant, lightfast, polyurethane-containing dispersion, having a Shore hardness lower than the given hardness of said outer layer, and being inseparably bonded with said outer layer.

3. The leather assembly according to claim 1, wherein said leather is a natural leather and said inner layer has a thickness of between 0.008 and 0.03 mm and is thinner than said outer layer.

4. The leather assembly according to claim 1, wherein said inner layer forms a porous film.

5. The leather assembly according to claim 1, wherein said outer layer is elastomeric and does not have thermoplastic properties and recovers completely after elongation at a temperature of between 100 and 120° C., and said inner layer is substantially not elastomeric and has a greater residual elongation than said outer layer at a temperature of from 100 to 120° C.

6. The leather assembly according to claim 1, wherein said outer layer is a porous layer.

7. The leather assembly according to claim 6, wherein said outer layer has through-pores formed therein, said through-pores having walls lined with a material of said inner layer adjacent said outer layer.

8. The leather assembly according to claim 1, wherein said outer layer contains pigments.

9. The leather assembly according to claim 1, which comprises hollow microspheres embedded into said outer layer.

10. The leather assembly according to claim 1, which comprises hollow microspheres embedded into said inner layer.

11. The leather assembly according to claim 1, wherein said outer layer consists essentially of a solidified polyester-polyurethane dispersion having a softening point in a dry condition between 180 and 240° C. without addition of a crosslinking agent.

12. The leather assembly according to claim 1, wherein said outer layer consists essentially of a solidified polyether-polyurethane dispersion having a softening point in a dry condition between 180 and 240° C. without addition of a crosslinking agent.

13. The leather assembly according to claim 1, wherein said inner layer is composed predominantly of a solidified polyester-polyurethane dispersion and in a dry state, without addition of a crosslinking agent, has a softening point of between 45 and 95° C.

14. The leather assembly according to claim 1, wherein said inner layer is composed predominantly of a solidified polyether-polyurethane dispersion and in the dry state, without addition of a crosslinking agentm, has a softening point of between 45 and 95° C.

15. The leather assembly according to claim 1, which further comprises an intermediate layer comprising a solidified, solids-containing polyurethane solution between said buffed upper surface of said leather and said inner layer.

16. The leather assembly according to claim 15, wherein said intermediate layer has a thickness of between 0.001 and 0.002 mm.

17. The leather assembly according to claim 15, wherein said intermediate layer is formed by spraying said polyurethane solution onto said buffed surface of said leather and subsequently removing the solvent.

18. The leather assembly according to claim 15, wherein said intermediate layer has a solids content of less than 8% by weight relative to the dispersion of said intermediate layer.

19. The leather assembly according to claim 1, wherein said outer layer has a solids content of more than 35% by weight relative to the dispersion of said outer layer.

20. The leather assembly according to claim 1, wherein said outer layer has a density of less than 0.95 g/cm$^3$.

21. The leather assembly according to claim 1, wherein said outer layer has been provided with a variety of different surface effects.

22. The leather assembly according to claim 21, wherein said outer layer is formed with representations or symbols during a production thereof.

23. The-leather assembly according to claim 22, wherein the representations or symbols are raised to project from an adjacent surface of said outer layer.

24. The leather assembly according to claim 23, wherein the thickness of said outer layer in the area of the raised representations and symbols is substantially equal to a thickness of said outer layer in an area of the adjacent surface.

25. The leather assembly according to claim 1, wherein the surface of said outer layer has markings formed thereon.

26. The leather assembly according to claim 1, wherein said outer layer has a nubuck-leather appearance.

27. The leather assembly according to claim 1, wherein at least some of said layers are formed with perforations.

28. The leather assembly according to claim 1, wherein said outer layer comprises a plurality of sublayers arranged one upon the other and formed by solidifying a polyurethane-containing dispersion sprayed onto a hot substrate.

29. The leather assembly according to claim 26, wherein said sublayers forming said outer layer have mutually different pigment contents.

30. The leather assembly according to claim 29, wherein the outer-layer sublayer forming one surface or visible side of the finish has a lower pigment content than the other layers.

31. The leather assembly according to claim 1, wherein said outer layer is a multicolor layer.

32. The leather assembly according to claim 1, wherein the leather assembly is substantially chromium-free.

* * * * *

UNITED STATES PATENT AND TRADEMARK OFFICE
CERTIFICATE OF CORRECTION

PATENT NO.    : 6,177,198 B1
DATED         : January 23, 2001
INVENTOR(S)   : Philipp Schäfer It is certified that error appears in the above-identified patent and that said Letters Patent is hereby corrected as shown below:

Item [30] should read as follows:

Jul. 7, 1998    [DE]..........298 12 075 U
Mar. 1, 1999    [DE]..........299 03 664 U
Feb. 10, 1999   [AT]..........GM 89/99

Signed and Sealed this

Fourth Day of December, 2001

*Attest:*

*Attesting Officer*

NICHOLAS P. GODICI
*Acting Director of the United States Patent and Trademark Office*